United States Patent
Or et al.

(10) Patent No.: US 11,543,245 B1
(45) Date of Patent: Jan. 3, 2023

(54) SYSTEM AND METHOD FOR ESTIMATING A LOCATION OF A VEHICLE USING INERTIAL SENSORS

(71) Applicant: ALMA Technologies Ltd., Haifa (IL)

(72) Inventors: Barak Or, Haifa (IL); Maxim Freydin, Haifa (IL); Gev Ben-Haim, Haifa (IL)

(73) Assignee: Alma Technologies Ltd., Haifa (IL)

( * ) Notice: Subject to any disclaimer, the term of this patent is extended or adjusted under 35 U.S.C. 154(b) by 0 days.

(21) Appl. No.: 17/720,688

(22) Filed: Apr. 14, 2022

(51) Int. Cl.
| | |
|---|---|
| G01C 21/16 | (2006.01) |
| G01P 15/18 | (2013.01) |
| G06N 5/02 | (2006.01) |
| G01C 19/00 | (2013.01) |
| G01P 15/08 | (2006.01) |

(52) U.S. Cl.
CPC .......... G01C 21/16 (2013.01); G01C 19/00 (2013.01); G01P 15/08 (2013.01); G01P 15/18 (2013.01); G06N 5/022 (2013.01)

(58) Field of Classification Search
CPC ......... G01C 21/16; G01C 19/00; G01P 15/08; G01P 15/18; G06N 5/022
USPC ...................................................... 701/500
See application file for complete search history.

(56) References Cited

U.S. PATENT DOCUMENTS

| 10,274,509 B1* | 4/2019 | Challoner ............ G01C 25/005 |
| 2009/0263009 A1* | 10/2009 | Krishnaswamy ......... G06T 7/35 |
| | | 382/154 |
| 2020/0143212 A1* | 5/2020 | Okazaki ................... G06N 3/08 |
| 2021/0341896 A1* | 11/2021 | Miklosovic ............ G06N 20/00 |

FOREIGN PATENT DOCUMENTS

| CN | 109151060 | * | 1/2019 |
| CN | 106919915 | * | 1/2020 |
| CN | 112129320 | * | 12/2020 |
| CN | 112603202 | * | 1/2022 |

* cited by examiner

Primary Examiner — Muhammad Shafi
(74) Attorney, Agent, or Firm — Pearl Cohen Zedek Latzer Baratz LLP

(57) ABSTRACT

A system and method for estimating a location of a vehicle, including, using a processor: measuring, via an inertial sensor attached to a vehicle, at least one of an acceleration or angular velocity of the vehicle; determining, via the processor, in the at least one of the acceleration or the angular velocity a signal signature based on a pattern recognition algorithm, wherein the signal signature is associated with a particular mark located at a particular location; determining, via the processor, that the vehicle is located at the particular location based on the predetermined association between the particular mark and the particular location; and providing, via the processor, the particular location to a human user or to a computerized application.

20 Claims, 8 Drawing Sheets

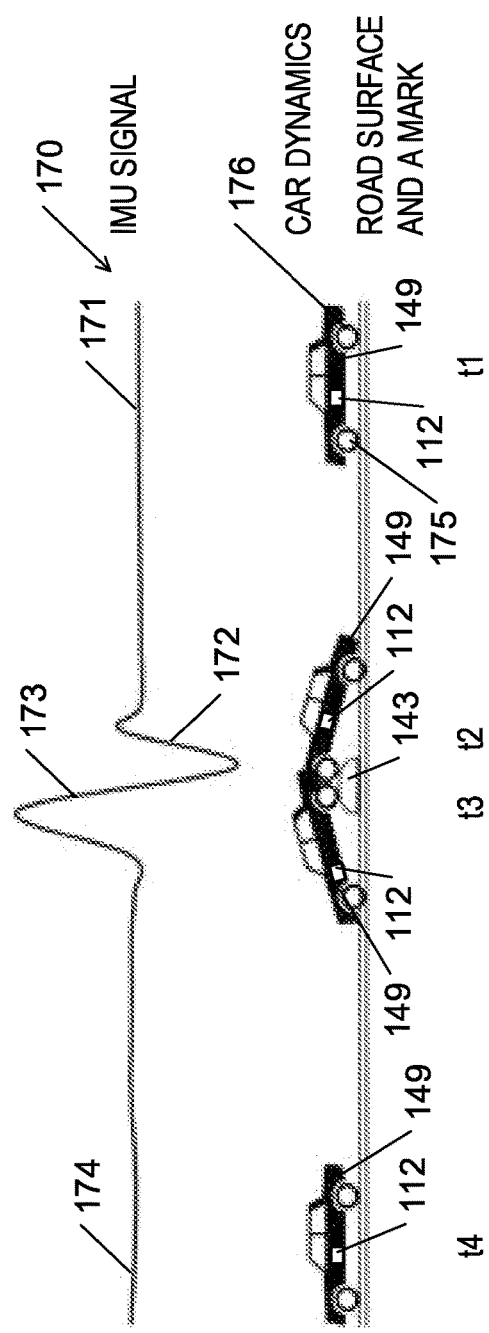
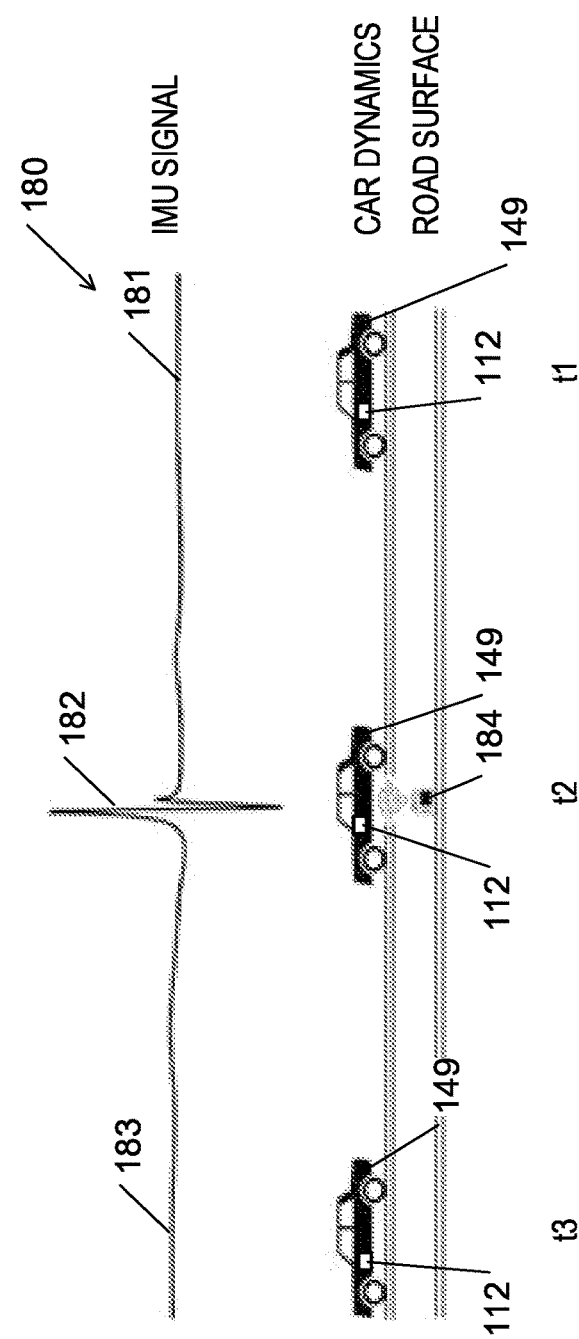

SYSTEM AND METHOD FOR ESTIMATING A LOCATION OF A VEHICLE USING INERTIAL SENSORS

FIELD OF THE INVENTION

The present invention relates generally to estimating a location of a vehicle and more specifically, to estimating a location of a vehicle using only inertial sensors.

BACKGROUND OF THE INVENTION

The need for high-accuracy localization, positioning and mapping solutions in real-time exists in many domains and applications. Current outdoor localization technology typically utilizes a satellite navigation device, also referred to as global navigation satellite system (GNSS) including for example, global positioning system (GPS), GLONASS, Galileo, Beidou and other satellite navigation systems. Drivers use GNSS systems routinely for localization and navigation. In addition, autonomous vehicle companies integrate localization and/or mapping sensors and algorithms to achieve high-accuracy localization solutions for driver safety.

However, GNSS cannot be used for indoor navigation, localization and/or positioning applications. Indoor navigation, localization and/or positioning applications may include, for example, navigating robots or vehicles in storage warehouses that are used to monitor and provide equipment efficiently, and/or navigating a vehicle in an indoor parking lot. Today, indoor localization is typically performed by applying sensor fusion schemes, where data acquired by many types of sensors is integrated to provide an estimation of the location of the vehicle.

In addition, GNSS may not provide adequate accuracy for some outdoor localization applications as well. For example, localization systems for autonomous vehicles may require higher accuracy than is provided by GNSS. Thus, localization systems for autonomous vehicles may also use sensor fusion to achieve high-accuracy localization solutions.

Sensor fusion for performing indoor navigation, localization and/or position applications typically includes fusing measurements from a camera, LiDAR, and inertial sensors. Camera and/or LiDAR sensors can be expensive. The quality of the data they provide may depend on various physical conditions, such as whether it is day or night, light or dark, and/or whether the camera or LiDAR measurement are taken in an urban canyon. The varying quality of the measurements cameras and LiDAR provide under the various physical conditions can cause data fusion to be inaccurate such that navigation and localization are erroneous. Therefore, it can be desirable to a high-accuracy localization and mapping solution for vehicles, for both indoor and outdoor, under various physical conditions with a reduced cost

SUMMARY OF THE INVENTION

One advantage of the invention can include an ability to provide accurate measurements, e.g., to be used for localization and/or navigation, under various physical conditions. Another advantage of the invention can include an ability to provide accurate measurements, e.g., to be used for localization and/or navigation, with inexpensive sensors.

Another advantage of the invention can include avoiding multiple beacons, direct-line-of-sight objects/beacons, expensive sensors, and/or computationally expensive computations due to, for example, an ability to provide accurate measurements with minimal/inexpensive sensors. Another advantage of the invention can include avoiding large data transfers due to, for example, lack of beacons and/or computer vision. Another advantage of the invention can include avoiding a need to provide constant and/or high power and/or maintenance to detectors.

A computer-based system and method for estimating a location of a vehicle may include, using a processor: measuring, via an inertial sensor attached to a vehicle, at least one of an acceleration or angular velocity of the vehicle; determining, via the processor, in the at least one of the acceleration or the angular velocity a signal signature based on a pattern recognition algorithm, wherein the signal signature is associated with a particular mark located at a particular location; determining, via the processor, that the vehicle is located at the particular location based on the predetermined association between the particular mark and the particular location; and providing, via the processor, the particular location to a human user or to a computerized application.

According to some embodiments of the invention, the particular mark includes a unique three-dimensional pattern including one or more elements selected from the list consisting of: bumps, grooves and road textures.

According to some embodiments of the invention, the particular mark includes electromagnetic device and the inertial sensor may further include a magnetometer.

According to some embodiments of the invention, the inertial sensor measures at least one of accelerations and angular velocities at x, y and z directions.

According to some embodiments of the invention, the road includes a plurality of lanes, where each of the lanes may include one of the plurality of predetermined unique marks, and embodiments of the method may further include determining the lane in which the vehicle is located based on the detected signal signature.

According to some embodiments of the invention, the road includes at least one lane, where the particular mark may be located on a lane border, and embodiments of the method may further include determining that the vehicle has crossed the lane border based on the detected signal signature.

According to some embodiments of the invention, the vehicle is a mobile robot or an unmanned ground vehicle.

According to some embodiments of the invention, the pattern recognition algorithm comprises a machine learning (ML) classifier, and wherein determining in the at least one of the acceleration or the angular velocity a signal signature includes: training the ML classifier using a training dataset, wherein the training dataset comprises labeled signals of the inertial sensor; and using the trained ML classifier to classify the readings of the inertial sensor.

Embodiments of the invention may further include: detecting in the readings of the inertial sensor signals associated with a second mark of the at least one mark; and determining a velocity of the vehicle by dividing a known distance between the second mark and the first mark by the time from the detection of the first mark to time of the detection of the second mark.

BRIEF DESCRIPTION OF THE DRAWINGS

Non-limiting examples of embodiments of the disclosure are described below with reference to figures listed below. The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings.

FIG. 7 is a schematic illustration a side view of a road and a vehicle driving over a mark at four time points and a corresponding signal, according to some embodiments of the invention.

FIG. 8 is a schematic illustration of a side view of a road and a vehicle driving over a magnetic mark at three time points and a corresponding signal, according to some embodiments of the invention.

Figure 1:
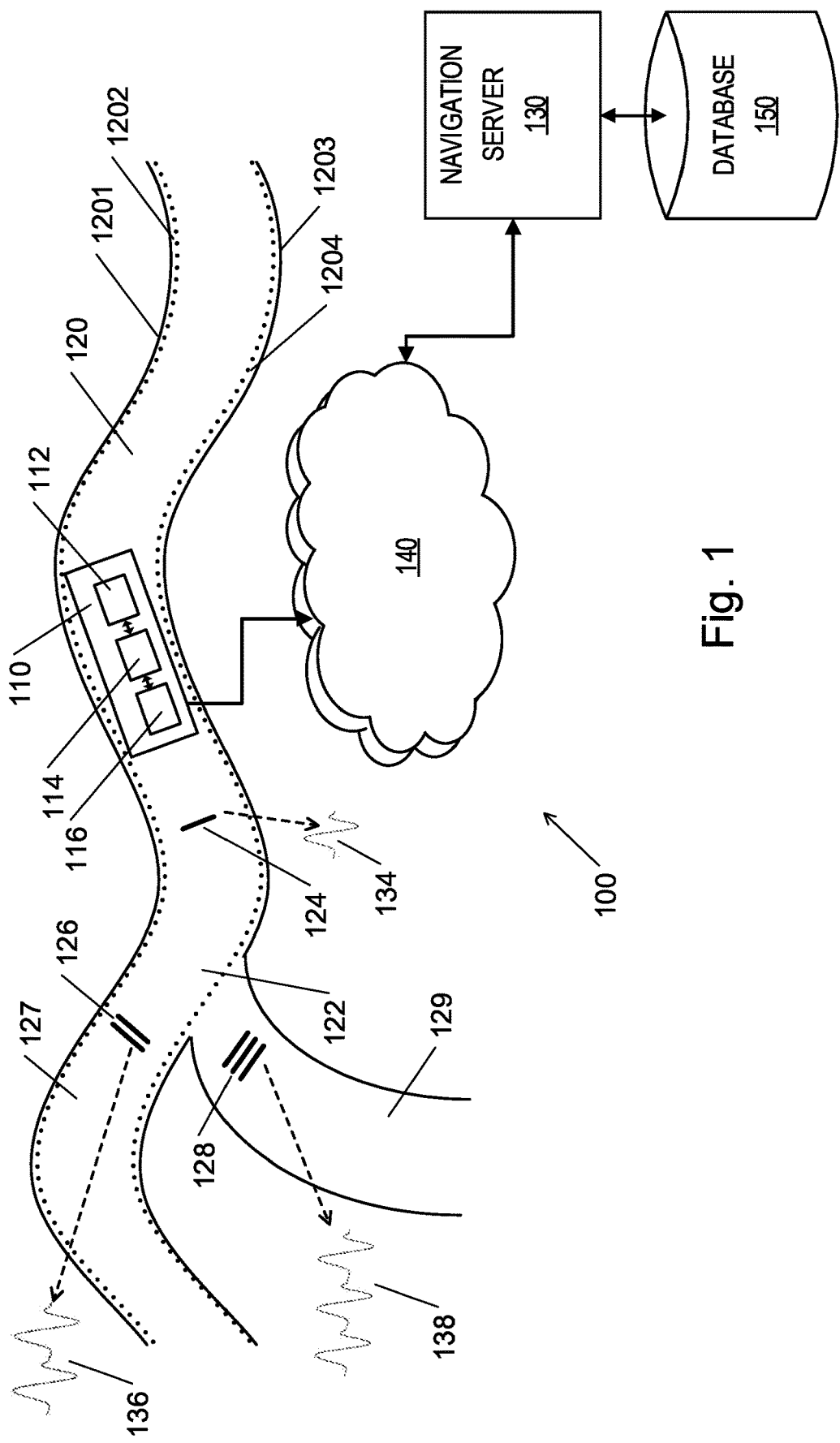
FIG. 1 is a diagram of a road and a block diagram of a system for providing a location of a vehicle, according to some embodiments of the invention.

It will be appreciated that, for simplicity and clarity of illustration, elements shown in the figures have not necessarily been drawn accurately or to scale. For example, the dimensions of some of the elements may be exaggerated relative to other elements for clarity, or several physical components may be included in one functional block or element. Reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Generally, roads may include road or surface imperfections or defects. The surface of a road can be described as having a signature, referred to herein as a geometrical signature of the road. The road imperfections may include bumps, potholes, cave-ins, sinkholes, hummocks, defective street cuts, surface deterioration, edge failure, cracking, rutting and/or subsidence. Some roads can include speed bumps, pavement markings, traffic markings, parking spot markings and/or other types of intentional markings that contribute to an imperfect flat surface of a road.

Generally, unintentional and the intentional road imperfections can be used as marks for estimating a location of a vehicle. The marks can be sensed by only inertial sensors that are installed in the vehicle. During vehicle operation, an inertial sensor, can measure an acceleration and/or angular velocities. The measured acceleration and/or angular velocity signals can be influenced by a particular geometrical signature of the road (e.g., marks on the road). For example, assume a vehicle travelling on a road, encountering a mark on the road can cause a particular change in an inertial sensor's measurements. Each mark can be identified and each mark can have a location associated with it. In this manner, using only an inertial sensor on a vehicle, an estimation of the location of the vehicle can be provided.

According to some embodiments, one or more inertial sensors is installed on vehicles, cars, trucks, motorcycles, unmanned ground vehicles, mobile robots and other moving ground platforms, commonly referred to herein as vehicles. For example, a first inertial sensor may be located at a front end of the vehicle and/or at a rear end of the vehicle.

As described above, marks in a road can be associated with a location, e.g., a geographical location, a location within a road (e.g., lane) or a location within a confined area, e.g., a parking lot. The mark may include a three-dimensional pattern, e.g., a combination of one or more bumps, grooves or road textures, arranged in a certain way. For example, a first lane in a highway may be marked with a repeating three-dimensional pattern including a single bump, that repeats every predetermined distance, e.g., every 10 meters, a second lane of the same highway may be marked with a repeating different three-dimensional pattern including for example two adjacent bumps, that repeats every predetermined distance, e.g., every 10 meters. A lane border of the highway may be marked with three-dimensional pattern including a change in the road texture, and/or each exit of the highway may include a unique mark that is associated with this exit. Thus, locations along or within the highway may be marked by various identifying patterns.

According to some embodiments, the mark includes a pattern in an electromagnetic pattern, that is generated in the desired locations by, for example, electromagnetic devices.

According to some embodiments of the invention, readings of an at least one inertial sensor that is attached to the vehicle are obtained and analyzed. For example, the readings may be analyzed to detect signals associated with road markings. Once such signals are detected, it may be assumed that the vehicle has crossed the marking and the location of the vehicle at the time the signals were required may be determined to be the location of the marking.

For example, if a vehicle drives along the highway described hereinabove, when signals associated with single bump are detected in the inertial sensor readings, it may be determined that the vehicle is in the first lane, when signals associated with the change in the road texture are detected in the inertial sensor readings, it may be determined that the vehicle is crossing a lane border, and when signals associated with a unique mark of a certain exit are detected, it may be determined that the vehicle is near this exit.

According to some embodiments of the invention, location of a mobile robot in a warehouse or an automated storage system is determined in the same way, e.g., an inertial sensor may be attached to the mobile robot, marks may be preinstalled in certain locations in the warehouse or automated storage systems, and the location of the mobile robot may be determined by detecting, in the sensor readings, signals associated with the marks.

Embodiments of the invention may improve the technology of vehicle navigation and localization, by providing a measurement of the location of the vehicle that is independent of the vehicle computing system and of independent of other navigation systems such as GPS. Determining a location of a vehicle according to embodiments of the invention may be performed outdoors or indoors. Embodiments of the invention may use as little as a single inertial sensor to measure the location of the vehicle. The location measured according to embodiments of the invention may be presented to the driver or other human users, may be used by navigation algorithms to obtain position of the vehicle. This location measurement may be used as a back-up for other location measurements.

An inertial sensor can include one or more accelerometers, one or more gyroscopes and/or one or more magnetometers. An inertial sensor can measure specific force and/or angular velocity of a vehicle in three dimensions, typically along one to three mutually perpendicular axes, x, y, and z. An inertial sensor may be an inertial measurement unit (IMU). The inertial sensor may be a MEMS IMU. The one or more gyroscopes can be three-dimensional gyroscope. The one or more gyroscopes can measure the angular velocities of the vehicle in the x, y, and/or z directions. The one or more accelerometers can be three-dimensional accelerometer. The one more accelerometers can measure the specific force and/or acceleration in the x, y, and/or z directions. The one or more magnetometers can measure the magnetic field surrounding the vehicle.

The x, y, and/or z directions can be defined in a Cartesian coordinate system where the x and y axes are horizontal and the z axis is vertical. Moving along surfaces, roads, and other terrains can result in a dynamic change of the readings of the inertial sensors. As is apparently to one of ordinary skill in the art, cameras and LiDAR sensors do not measure the specific force and acceleration in the x, y, and/or z directions.

FIG. 1 is a diagram of a road and a block diagram of a system 100 for providing a location of a vehicle 110, according to some embodiments of the invention. System 100 may include a vehicle 110, equipped with an inertial sensor 112. The inertial sensor 112 can be an IMU. The IMU can be a single IMU sensor that measures acceleration and angular velocity at 100 Hertz. In some embodiments, the measurement frequency is higher.

The inertial sensor can include an accelerometer, a three-dimensional accelerometer, a gyroscope and/or a three-dimensional gyroscope. The inertial sensor 112 may take measurements that provide specific force, angular velocity and/or the orientation of a vehicle over time.

Inertial sensor 112 may generate time series data of specific forces and/or angular velocities in one or more directions over time. In some embodiments, where the inertial sensor is an MEMS IMU with a magnetometer, the time series data can include magnetic field measurements. In some embodiments, inertial sensor 112 is attached to the vehicle 110. In some embodiments, the inertial sensor 112 is within a mobile device (e.g., a cell phone) and can be mounted on a car dashboard area. In some embodiments, the inertial sensor 112 is one of the sensors that are within the vehicle 110.

Vehicle 110 may further include a processor 114 and a communication module 116. During operation, the processor 114 can process and/or transmit data measured by the inertial sensor 112 to a navigation server 130. In the example provided in FIG. 1, vehicle 110 may be a vehicle moving along a road 120, 127, or 129, respectively. The vehicle 110 can move in any area, such as a parking lot, a tunnel, a field, an urban canyon, and/or an indoor area. Processor 114 may provide, via communication module 116, the data measured by the inertial sensor 112 to a navigation server 130 directly or through networks 140.

As described above, measurements obtained can be obtained only by inertial sensors. In this manner, the necessity for camera, LiDAR and/or additional sensors in order to, for example, provide measurements that can be used to determine localization information can be eliminated.

In some embodiments, a plurality of inertial sensors are used. In these embodiments, corresponding signals (e.g., velocity signal at time t=1) of the plurality sensor units 112 may be unified, e.g., averaged, to increase the signal to noise ratio. Other methods may be used to unify readings of a plurality of sensor units 112.

Some vehicles can include spring-dampers systems. In some embodiments, the inertial sensor is positioned under a spring-dampers system of the vehicle. In these embodiments, the road surface perturbations can be measured. Positioning the inertial sensors above the spring-dampers system can cause car dynamic measurements (e.g., effects of the spring-dampers system) to be included in the inertial sensor measurements, thus it can be desirable to position the inertial sensor below the spring-damper system.

According to some embodiments, the inertial sensors are installed on a front wheel axles of vehicle 110. For example, the body of vehicle 110 may be connected to the wheel axles of vehicle 110 through a system of springs and dampers.

Networks 140 may include any type of network or combination of networks available for supporting communication between processor 114 and navigation server 130. Networks 140 may include for example, a wired, wireless, fiber optic, cellular or any other type of connection, a local area network (LAN), a wide area network (WAN), the Internet and intranet networks, etc. Each of navigation server 130 and processor 114 may be or may include a computing device, such as computing device 700 depicted in FIG. 12. One or more databases 150 may be or may include a storage device, such as storage device 730. In some embodiments, navigation server 130 and database 150 is implemented in a remote location, e.g., in a 'cloud' computing system.

According to some embodiments of the invention, navigation server 130 stores in database 150 data obtained from processor 114 and other data, such as mapping of terrain and/or roads 120, 127 and 129, association of each of marks 124, 126 and 128 (and/or signal signatures 134, 136 and 138 associated therewith) with a respective location, computational results, and any other data as required by the application.

According to some embodiments of the invention, navigation server 130 can obtain accelerations and/or angular velocities from the inertial sensors over time of vehicle 110 moving in roads 120, 127 or 129 and calculate the location of vehicle 110 based on the runtime acceleration and angular velocities and the association of marks 124, 126 and 128 with locations.

According to some embodiments of the invention, processor 114 determines the signal signatures 134, 136 and 138 in the runtime acceleration and angular velocities locally and sends an indication of the identified signal signature 134, 136 and 138 to navigation server 130. The navigation server 130 can determine the location of vehicle 110 based on the identified signal signature 134, 136 and 138. According to some embodiments of the invention, processor 114 calculates the location of vehicle 110 based on the runtime acceleration and angular velocities locally and send the location to navigation server 130.

Vehicle 110 may further be equipped with processor 114, that may be configured to obtain readings of inertial sensor 112, e.g., at least one of the acceleration or the angular velocity. For example, processor 114 may be connected to inertial sensor 112, and may acquire readings of inertial sensor 112. Processor 114 may label each reading with a timestamp. Processor 114 may create the timestamp using an inner system clock of processor 114 or with an external clock.

According to some embodiments of the invention, system 100 further includes marks 124, 126 and 128 placed along roads 120, 127 or 129, respectively. For example, each of marks 124, 126 and 128 may include a pattern, e.g., a three-dimensional pattern including one or more elements such as bumps, grooves, road textures, etc.

In this example, the patterns of marks 124, 126 and 128 are different from one another. For example, mark 124 may include a single bump, mark 126 may include two adjacent (e.g., as used herein adjacent may mean up to 1 meter apart, although other distances may be used) bumps, and mark 128 may include three adjacent bumps. Each of marks 124, 126 and 128 may be intentionally installed in known locations along roads 120, 127 or 129, for example, mark 124 may be installed just prior to road split 122, mark 126 may be installed just after to road split 122, at road 127 and mark 128 may be installed just after to road split 122, at road 129.

Vehicle 110, with inertial sensor 112 may drive along road 120 and over mark 124. It may be assumed that when vehicle 110 is crossing or driving over mark 124, a change in accelerations and angular rates or velocities of vehicle 110 may occur. This change in accelerations and angular rates or velocities of vehicle 110 may be measured inertial sensor 112. A change in accelerations and angular rates or velocities of vehicle 110 may be present in at least one signal measured by inertial sensor 112, e.g., as a specific irregularity or pattern, referred to as the signal signature.

According to some embodiments of the invention, readings of inertial sensor 112 are obtained and analyzed, e.g., by processor 114 and/or navigation server 130, and the signal signature 134 of mark 124 may be detected or determined. Thus, when signal signature 134 of mark 124 is detected or determined, processor 114 and/or navigation server 130 may determine that vehicle 110 has crossed mark 124 and was located at the location of mark 124 at the time when signal signature 134 was picked, e.g., right before road split 122. At road split 122, vehicle 110 may either take road 127 or road 129. If vehicle 110 takes road 127, then vehicle 110 may drive over mark 126. If, however, vehicle 110 takes road 129, vehicle 110 may drive over mark 128. Since the signal signatures 136 and 138, associated with marks 126 and 128, respectively, are different from one another, detecting or determining one of signal signatures 136 and 138 in the signals picked by inertial sensor 112 may indicate whether vehicle 110 has continued to road 127 or to road 129. For example, if signal signature 136 (e.g., the signal signature of mark 126) is detected, then it may be concluded that vehicle 110 has continued to road 127, and if signal signature 138 (e.g., the signal signature of mark 128) is detected, then it may be concluded that vehicle 110 has continued to road 129.

According to some embodiments of the invention, each of marks 124, 126 and 128 are designed in a manner that when vehicle 110 with inertial sensor 112 drives over a mark 124, 126 or 128, a signal signature 134, 136 and 138 that is associated with this mark is distinguishable in the signals picked by inertial sensor 112. In some embodiments, each of signal signatures 134, 136 and 138 is unique and associated with a particular mark of marks 124, 126 and 128 located at a particular location.

According to some embodiments of the invention, signal signatures 134, 136 and 138 are detected using pattern recognition. Pattern recognition may include any data analysis method that automatically recognizes or classifies patterns and regularities in data, e.g., time series data enquired by inertial sensor 112. Pattern recognition may be performed by a trained machine learning (ML) classifier or model, e.g., a neural network, a logistic regression model, linear classifiers, etc. Multiple drives over a single mark can occur. Each drive a single 6-channel IMU can be used. Each time the vehicle is driven over a mark, a recording of the signal can be made. For example, a labeled dataset may be created or built for each signal signature 134, 136 and 138. For example, to create a labeled dataset for mark 124, one or more vehicles 110 with a inertial sensor 112 may drive again and again over mark 124 and the signals of the inertial sensor 112 at the time vehicle 110 crosses mark 124 may be recorded and labeled as "mark 124 sensed" (e.g., as including signal signature 134).

Other samples of signals of the inertial sensor 112, e.g., recorded at flat parts of a road, may be labeled as "mark 124 not sensed" (e.g., as not including signal signature 134). The samples may include the signals measured by inertial sensor 112, e.g., at least one of a specific force or angular velocity of the vehicle at one or more directions over a predefined time window, for example, 1, 3, 5 seconds. Other time windows may be used. The samples labeled as "mark 124 sensed" and the samples labeled as "mark 124 not sensed" may form the training dataset and may be used to train an ML classifier to classify signals picked by inertial sensor 112 as including or not including signal signature 134.

The training dataset may include for example 1000, 10,000 or more of each of "mark sensed" and "mark not sensed" samples. A similar process may be performed for other marks. Thus, a plurality of classifiers may be trained and used to detect signal signature 134, 136 and 138. In some embodiments, a single classifier is trained to detect a plurality of signal signature 134, 136 and 138. Other methods for pattern recognition may be used to detect signal signatures 134, 136 and 138 such as fast Fourier transform (FFT), wavelet analysis, etc.

According to embodiments of the invention, lane borders 1201 and 1203, also include a mark 1202 and 1204, respectively. Thus, in case vehicle 110 crosses one of lane borders 1201 and 1203, a signal signature that is associated with the respective mark, e.g., one of marks 1202 and 1204, may be detected. Accordingly, a processor may determine that vehicle 110 has crossed one of lane borders 1201 and 1203 based on the detected signal signature.

Figure 2:
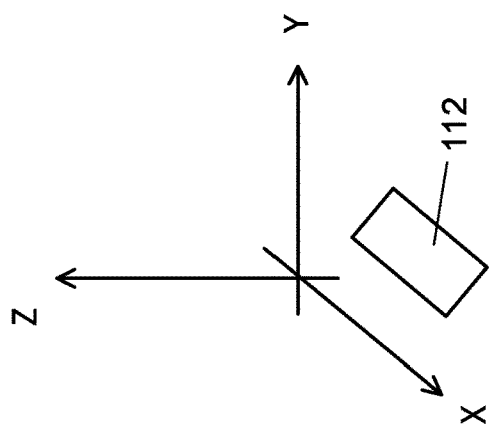
FIG. 2 is a schematic illustration of sensor unit with relation to a Cartesian coordinate system, according to some embodiments of the invention.

FIG. 2 presents a schematic illustration of inertial sensor 112 with relation to a Cartesian coordinate system, according to some embodiments of the invention. Inertial sensor 112 may measure accelerations in the x, y and z directions (referred to herein as $a_x$, $a_y$ and $a_z$ respectively) and angular velocities in the x, y and z directions (referred to herein as $w_x$, $w_y$ and $w_z$ respectively), where the x-y plain is horizontal (e.g., a plane parallel to the horizon) and the z-x and z-y plains are vertical (e.g., plane perpendicular to the horizon).

Figure 3:
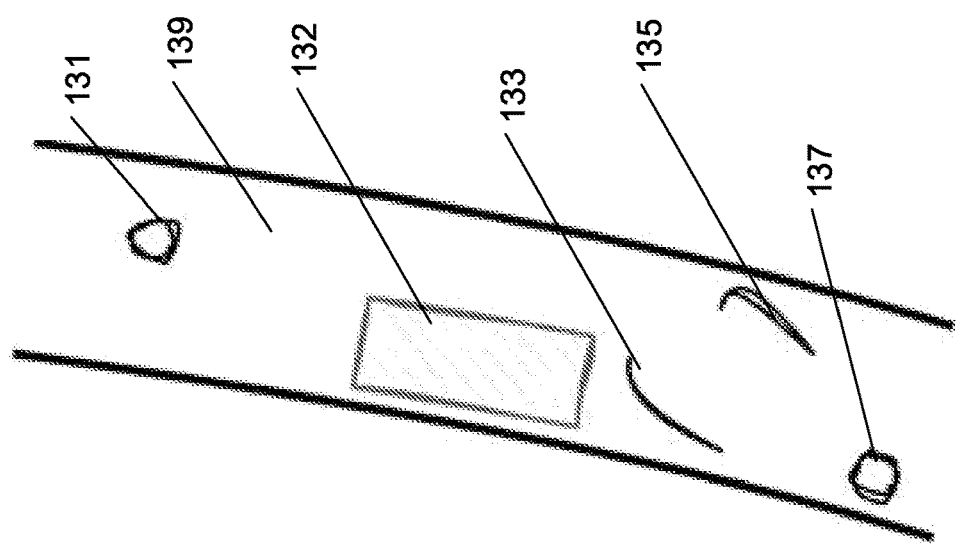
FIG. 3 is a diagram of a top-down view of a road with surface imperfections, according to some embodiments of the invention.

In some embodiments, road or surface imperfections that were generated as a natural process of road degradation are used as marks, and when sensed may provide indication of the location of vehicle 110. FIG. 3 is a diagram of a top-down view of road 139 with surface imperfections 131, 132, 133, 135 and 137 that may be used as marks, according to some embodiments of the invention. For example, a signal signature and locations of surface imperfections 131, 132, 133, 135 and 137 may be learned and used to determine a location of vehicle 110.

Figure 4:
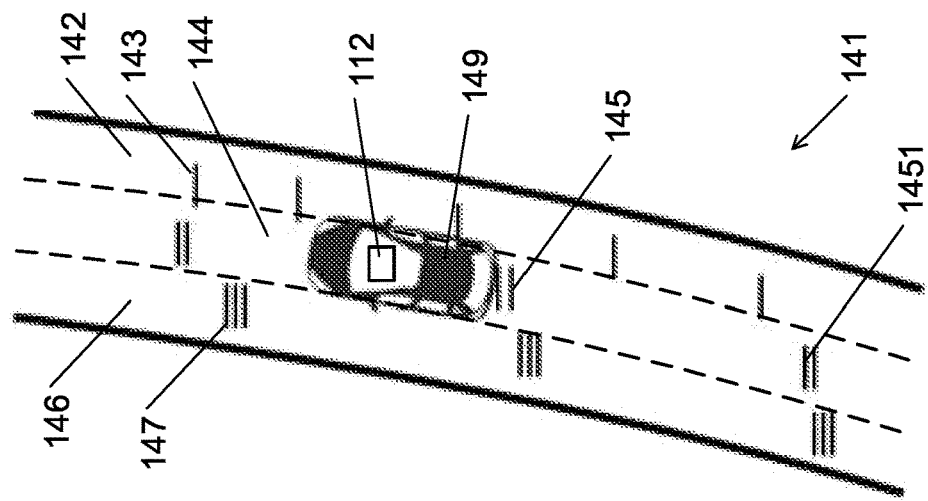
FIG. 4 is a diagram of top-down view of a road with lane marks, according to some embodiments of the invention.

Reference is now made to FIG. 4 is a diagram of top-down view of a road with lane marks, according to some embodiments of the invention. In the example presented in FIG. 4, a first lane 142 in road 141 is marked by a first mark 143 including a single bump, that repeats every predetermined distance, e.g., 10, 15, 20 meters or other distance. A second lane 144 in road 141 is marked by a second mark 145 including two adjacent bumps, that repeat every predetermined distance, and a third lane 146 in road 141 is marked by a third mark 143 including three adjacent bumps, that repeat every predetermined distance. According to some embodiments of the invention, signal signatures of marks 143, 145 and 147 are learned, e.g., one or more classifiers may be trained to detect signal signatures of sensor readings associated with each of marks 143, 145 and 147, and used in real time to analyze signal readings from inertial sensor attached to vehicle 149. If a signal signature associated with mark 143 is detected, then it may be determined that vehicle 149 is driving in lane 142 and if a signal signature associated with mark 147 is detected, then it may be determined that vehicle 149 is driving in lane 146. In this example, however, a signal signature associated with mark 145 is detected, thus it may be determined that vehicle 149 is driving in lane 146, as shown in FIG. 4. Lane detection may be highly beneficial for providing advanced driver-assistance systems (ADAS) that may assist drivers in driving and parking functions.

It should be noted with relation to FIG. 4, that in addition to determining the lane that vehicle 149 is driving within, the velocity of vehicle 149 may be determined as well. For example, the velocity of vehicle 149 may be determined by dividing a known distance between two marks on the same lane in which vehicle 149 is driving by the time difference of the detection of the two marks on the same lane. In FIG. 4, the velocity of vehicle 149 may be determined by dividing a known distance between mark 145 and 1451 and the time difference of the detection of sign signatures of marks 145 and 1451. The calculation may be repeated for more than two pairs of adjacent marks and an average may be taken to remove noise.

Figure 5:
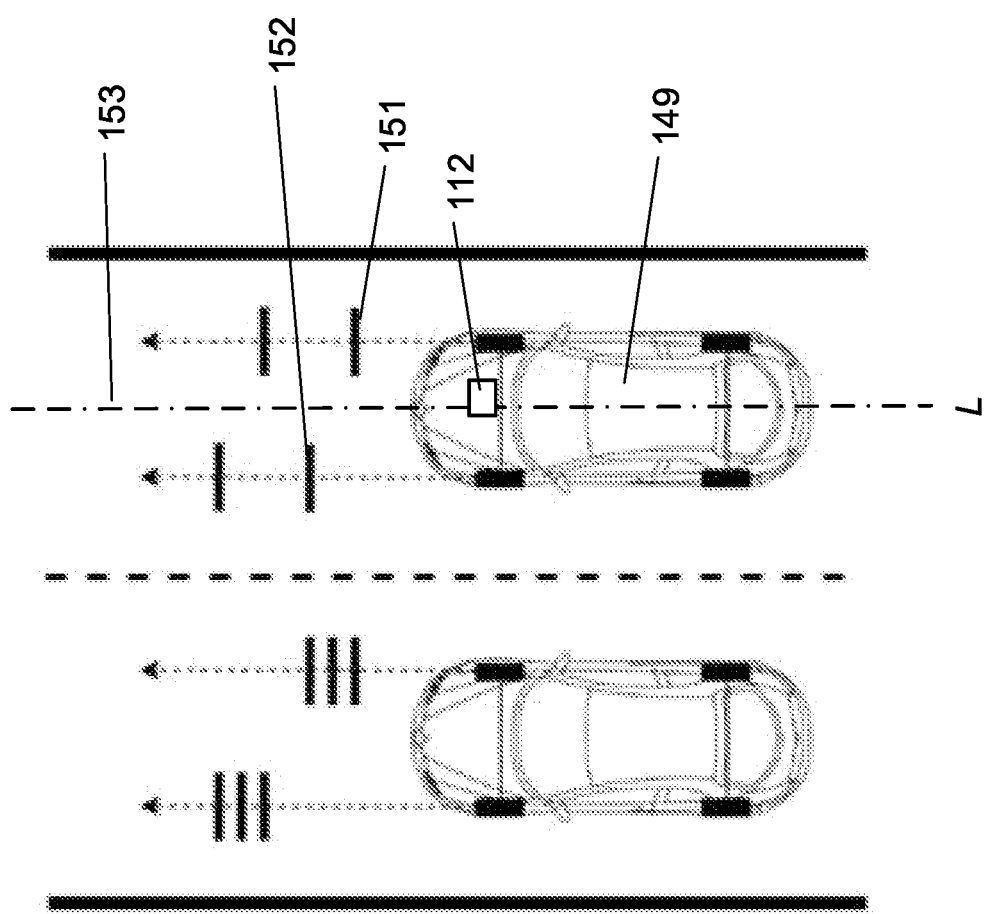
FIG. 5 is a diagram of top-down view of a road with unequal lane marks, according to some embodiments of the invention.

Reference is now made to FIG. 5 which is a diagram of top-down view of a road with unequal lane marks, according to some embodiments of the invention. In the example presented in FIG. 5, artificial elements of marks 151 and 152 in lane 153 are installed at different locations relatively to one another along a longitudinal axis L of lane 153 at the two sides of lane 153 such that each side of the vehicle 149 or each side of the wheelbase of vehicle 149 goes over marks 151 or 152 at a different times. Hence, such installations may generate a unique signal signature that not only affects the angular velocity on the x axis (pitch) but the angular velocity on the y axis (roll) as the vehicle rolls at specific rates while passing on the elements.

Figure 6:
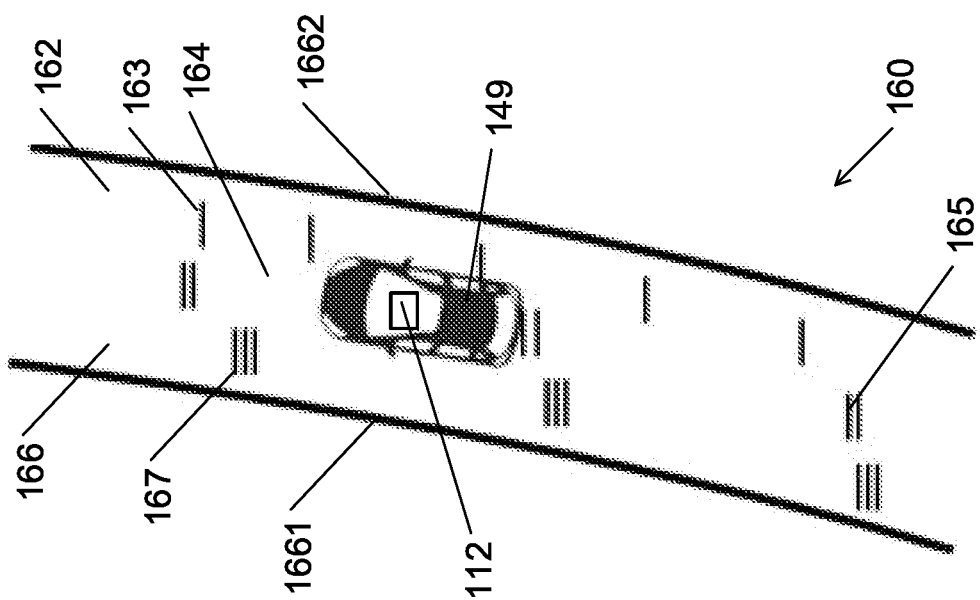
FIG. 6 is a diagram of top-down view of a road with inner-lane marks, according to some embodiments of the invention.

A similar effect is used in the following example to determine a location of vehicle within a lane. FIG. 6 is a diagram of top-down view of a road with inner-lane marks 163, 165 and 167, according to some embodiments of the invention. In the example presented in FIG. 6, a single lane 160 is divided horizontally into three longitudinal thirds or stipes such that when they are sensed by the inertial sensor the location of vehicle 149 relatively to the center of lane 160 can be determined. A first stripe 162 in lane 160 is marked by a first mark 163 including a single bump, that repeats every predetermined distance, e.g., 10, 15, 20 meters or other distance. A second stripe 164 in lane 160 is marked by a second mark 165 including two adjacent bumps, that repeat every predetermined distance, and a third stripe 166 in lane 160 is marked by a third mark 163 including three adjacent bumps, that repeat every predetermined distance. The signal signature of sensor unit 120 of vehicle 149 can change depending on the location of vehicle 149 relatively to the center of lane 160. The location of vehicle 149 with relation to the center of lane 160 may be determined based on the signal signature. According to some embodiments of the invention, detection of the location of vehicle location with relation to the lane center is highly beneficial for providing advanced driver-assistance systems (ADAS) that may assist drivers in driving and parking functions.

Reference is now made to FIG. 7 which is a schematic illustration of a side view of a road and vehicle 149 driving over mark 143 at four time points t1, t2, t3 and t4, and a corresponding signal, according to some embodiments of the invention. At time t1, vehicle 149 is before mark 143, so the signal 170 (e.g., angular velocity or acceleration signal) depicted by inertial sensor 112 includes a substantially straight line 171. At time t2, the front wheels 175 of vehicle 149 are crossing mark 143, and so a change 172 appears in the reading of inertial sensor 112. In time t3, the rear wheels 176 of vehicle 149 are crossing mark 143, and so the reading of inertial sensor 112 continue to change 173. At time t4, vehicle 149 is after mark 143, so the signal depicted by inertial sensor 112 includes a substantially straight line again 174.

Reference is now made to FIG. 8 which is a schematic illustration of a side view of a road and a vehicle 149 driving over magnetic mark 184, e.g., an electromagnetic device that generates a magnetic field, at the time points t1, t2, and t3, and a corresponding signal, according to some embodiments of the invention. At time t1, vehicle 149 is before mark 184, so the signal 180 depicted by a magnetometer in inertial sensor 112 includes a substantially straight line 181. In time t2, vehicle 149 crosses mark 184, and so a change 182 appears in the reading of inertial sensor 112. At time t3, vehicle 149 is after mark 184, so the signal depicted by the magnetometer in inertial sensor 112 includes a substantially straight line again 183.

Figure 9:
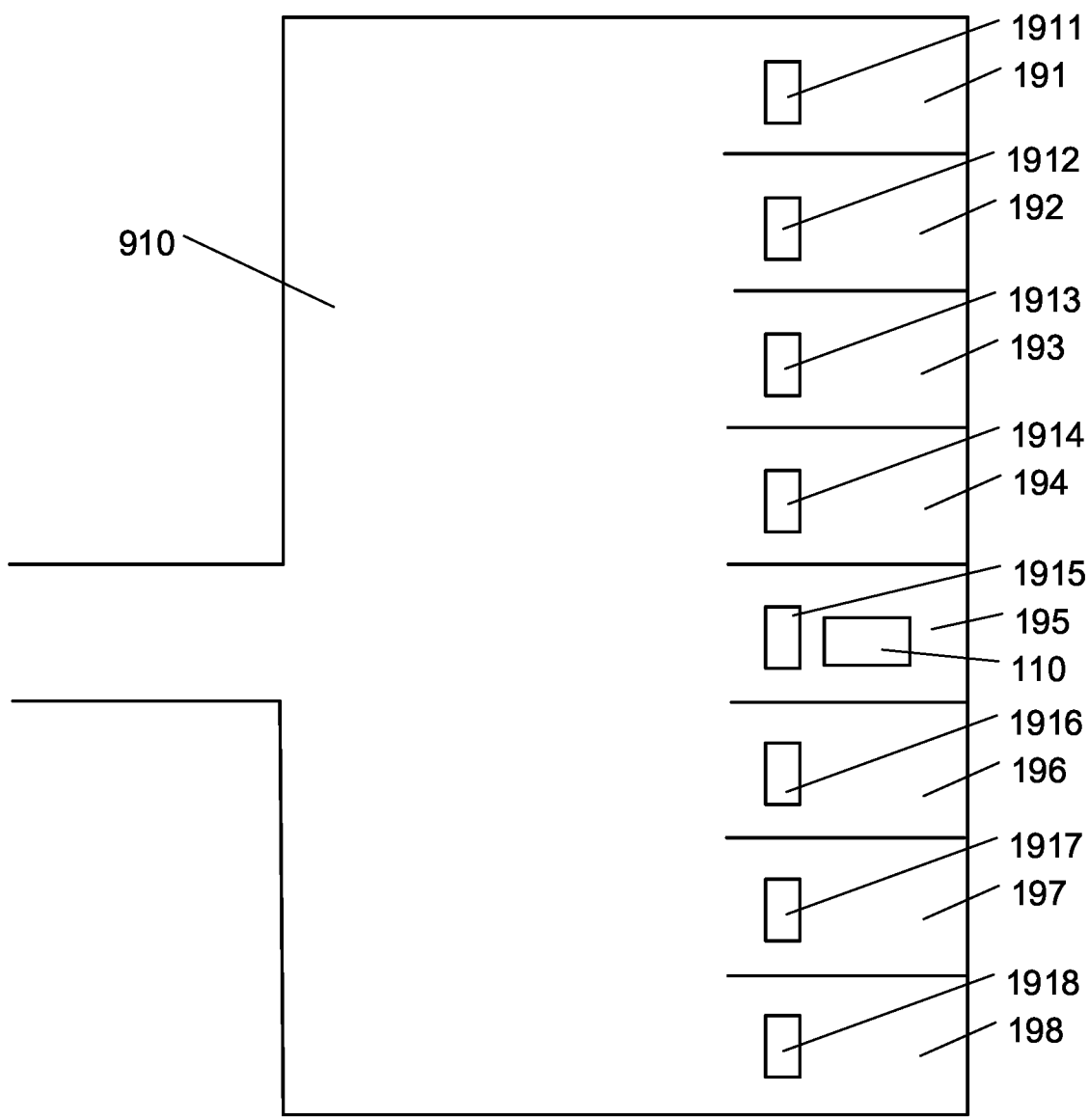
FIG. 9 is a schematic illustration of a top-down view of a parking lot with markings, according to some embodiments of the invention.

Reference is now made to FIG. 9 which is a schematic illustration of a top-down view of a parking lot 910 with markings 1911-1918, according to some embodiments of the invention. In the example presented in FIG. 9, each of parking spots 191-198 has a unique marking 1911-1918, respectively. As vehicle 110 parks in one of parking spots 191-198 a signal signature may be detected in the readings of inertial sensor 112 of vehicle 112, and the specific parking spot in which vehicle 110 has parked may be determined, in this example, parking spot 195.

Figure 10:
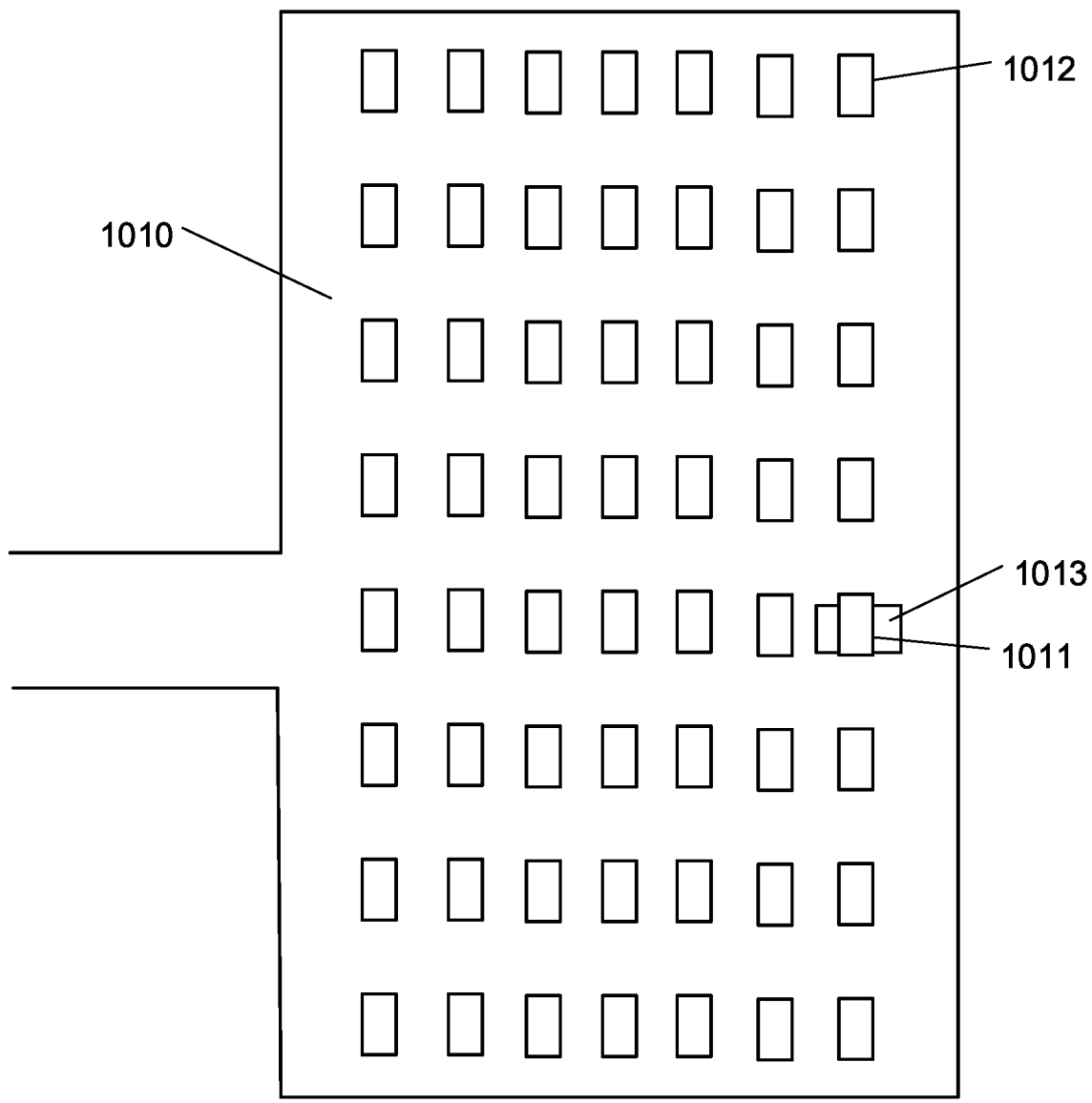
FIG. 10 is a schematic illustration of a top-down view of a storage warehouse with markings, according to some embodiments of the invention.

Reference is now made to FIG. 10 which is a schematic illustration of a top-down view of a storage warehouse 1010 with markings 1012, according to some embodiments of the invention. A robot 1013 with a sensor unit similar to inertial sensor 112 (not shown) may move along storage warehouses 1010 and cross markings 1012. Each of markings 1012 may have a unique associated signal signature. As robot 1013 moves along storage warehouse 1010 the signal signatures may be detected in the readings of inertial sensor 112 of robot 1013, and the location in which robot 1013 is placed may be determined, in this example, over mark 2011.

Figure 11:
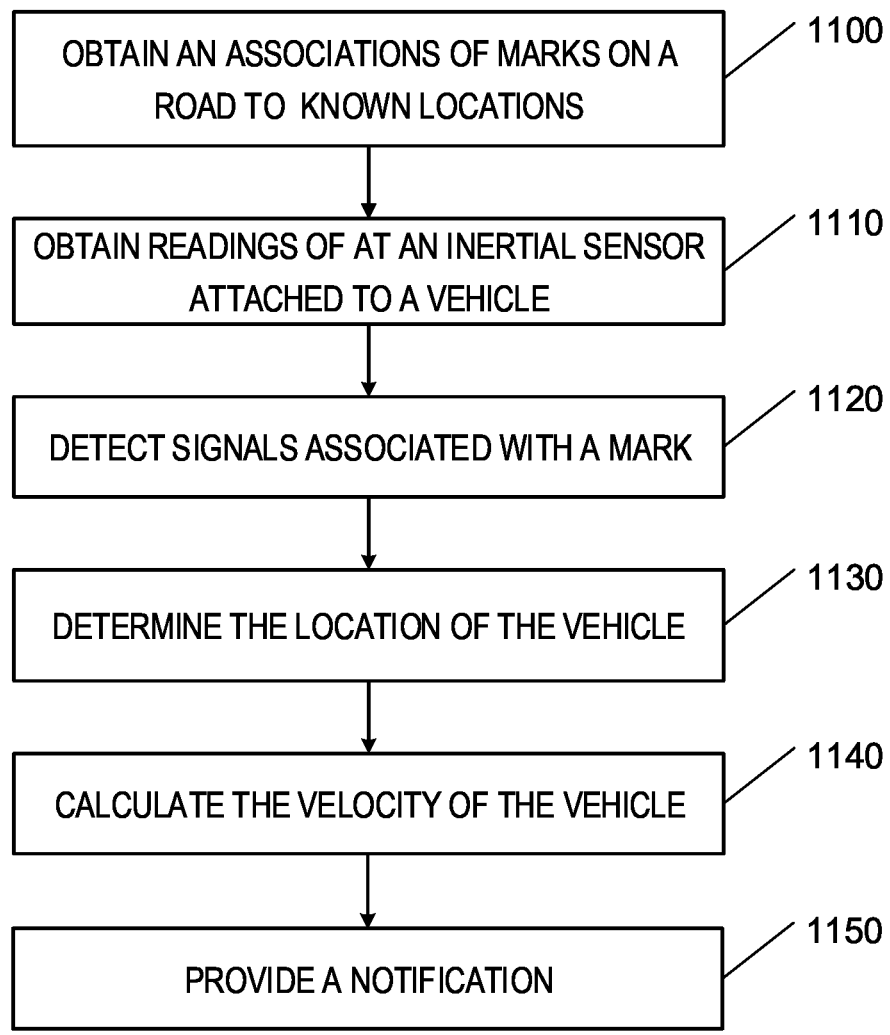
FIG. 11 is a flowchart of a method for estimating a location of a vehicle using an inertial sensor, according to some embodiments of the present invention.

FIG. 11 shows a flowchart of a method for estimating a location of a vehicle using an inertial sensor, according to some embodiments of the present invention. The operations of FIG. 21 may be performed by the systems described in FIGS. 1 and 12, but other systems may be used.

In operation 1100, a processor, e.g., processor 705, 130 or 114 may obtain an association of each of one or more marks on a road, e.g., marks 124, 126, 128 or signal signatures 134, 136 and 138 associated therewith, and other marks and/or signal signatures as disclosed herein, to a known location of that mark, e.g., each mark or signal signature may be associated with a particular geographical location. In operation 1110, the processor may obtain readings of an inertial sensor, e.g., inertial sensor 112, that may be attached to a vehicle. e.g., vehicle 110. The reading obtained from the single sensor may include one or more of the accelerations, angular velocities at x, y and z directions, or magnetic fields measured by the sensor over time. In operation 1120, the processor may detect or determine in the readings of the inertial sensor signals associated with a mark, e.g., the processor may detect the signal signature associated with the mark. For example, the processor may detect the signal signature using pattern recognition algorithm such as a trained classifier. In operation 1130, the processor may determine that the vehicle is located at the location that is associated with the mark based on the detected signal signature. In operation 1140, the processor may determine the velocity of the vehicle by detecting or determining in the readings of the inertial sensor signal signatures associated with a second mark and dividing a known distance between the two marks by the time from the detection of the first mark to time of the detection of the second mark. In operation 1150, the processor may provide a notification to a human user or to a computerized applications that use the location and/or velocity readings, such as computerized navigation applications. The notification may include the detected location, the calculated velocity and other relevant information.

Figure 12:
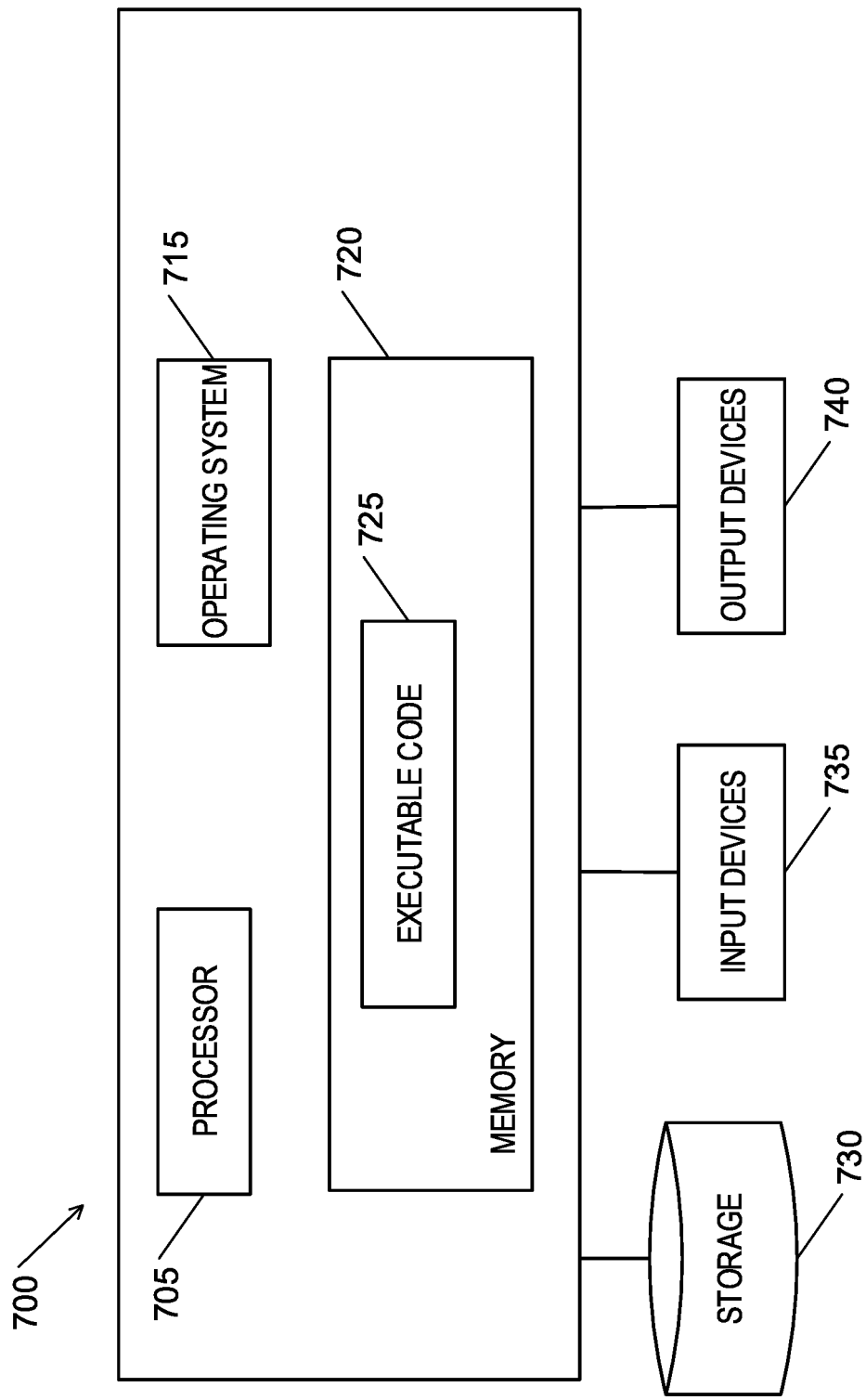
FIG. 12 shows a high-level block diagram of an exemplary computing device according to some embodiments of the present invention.

Reference is made to FIG. 12, showing a high-level block diagram of an exemplary computing device according to some embodiments of the present invention. Computing device 700 may include a processor 705 that may be, for example, a central processing unit processor (CPU) or any other suitable multi-purpose or specific processors or controllers, a chip or any suitable computing or computational device, an operating system 715, a memory 120, executable code 725, a storage system 730, input devices 735 and output devices 740. Processor 705 (or one or more controllers or processors, possibly across multiple units or devices) may be configured to carry out methods described herein, and/or to execute or act as the various modules, units, etc. for example when executing code 725. More than one computing device 700 may be included in, and one or more computing devices 700 may be, or act as the components of, a system according to embodiments of the invention. Various components, computers, and modules of FIGS. 1, 2, 3A, 3B, 8A and 8B may include devices such as computing device 700, and one or more devices such as computing device 700 may carry out functions such as those described in FIGS. 9 and 10. For example, navigation server 130 and processors 114 may be implemented on or executed by a computing device 700.

Operating system 715 may be or may include any code segment (e.g., one similar to executable code 725) designed and/or configured to perform tasks involving coordination, scheduling, arbitration, controlling or otherwise managing operation of computing device 700, for example, scheduling execution of software programs or enabling software programs or other modules or units to communicate.

Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory or storage units. Memory 720 may be or may include a plurality of, possibly different memory units. Memory 720 may be a computer or processor non-transitory readable medium, or a computer non-transitory storage medium, e.g., a RAM.

Executable code 725 may be any executable code, e.g., an application, a program, a process, task or script. Executable code 725 may be executed by processor 705 possibly under control of operating system 715. For example, executable code 725 may configure processor 705 to estimate a velocity of a vehicle using readings of one or more inertial sensors, and perform other methods as described herein. Although, for the sake of clarity, a single item of executable code 725 is shown in FIG. 12, a system according to some embodiments of the invention includes a plurality of executable code segments similar to executable code 725 that may be loaded into memory 720 and cause processor 705 to carry out methods described herein.

Storage system 730 may be or may include, for example, a hard disk drive, a CD-Recordable (CD-R) drive, a Blu-ray disk (BD), a universal serial bus (USB) device or other suitable removable and/or fixed storage unit. Data such as the measured velocities as well as other data required for performing embodiments of the invention, may be stored in storage system 730 and may be loaded from storage system 730 into memory 720 where it may be processed by processor 705. Some of the components shown in FIG. 12 may be omitted. For example, memory 720 may be a non-volatile memory having the storage capacity of storage system 730. Accordingly, although shown as a separate component, storage system 730 may be embedded or included in memory 720.

Input devices 735 may be or may include a mouse, a keyboard, a microphone, a touch screen or pad or any suitable input device. Any suitable number of input devices may be operatively connected to computing device 700 as shown by block 735. Output devices 740 may include one or more displays or monitors, speakers and/or any other suitable output devices. Any suitable number of output devices may be operatively connected to computing device 700 as shown by block 740. Any applicable input/output (I/O) devices may be connected to computing device 700 as shown by blocks 735 and 740. For example, a wired or wireless network interface card (NIC), a printer, a universal serial bus (USB) device or external hard drive may be included in input devices 735 and/or output devices 740.

In some embodiments, device 700 includes or may be, for example, a personal computer, a desktop computer, a laptop computer, a workstation, a server computer, a network device, a smartphone or any other suitable computing device. A system as described herein may include one or more devices such as computing device 700.

When discussed herein, a computer processor performing functions may mean one computer processor performing the functions or multiple computer processors or modules performing the functions; for example, a process as described herein may be performed by one or more processors, possibly in different locations.

In the description and claims of the present application, each of the verbs, "comprise", "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Embodiments comprising different combinations of features noted in the described embodiments, will occur to a person having ordinary skill in the art. Some elements described with respect to one embodiment may be combined with features or elements described with respect to other embodiments. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. A method for estimating a location of a vehicle, the method comprising, using a processor:
    measuring, via only an inertial sensor attached to a vehicle, at least one of an acceleration or angular velocity of the vehicle;
    determining, via the processor, in the at least one of the acceleration or the angular velocity a signal signature based on a pattern recognition algorithm, wherein the signal signature is associated with a particular mark located at a particular location, wherein the particular mark comprises a unique three-dimensional pattern including one or more elements selected from the list consisting of: bumps, grooves and road textures, wherein the one or more elements affect an angular velocity on the x axis and an angular velocity on the y axis as the vehicle rolls while passing over the elements;
    determining, via the processor, that the vehicle is located at the particular location based on a predetermined association between the particular mark and the particular location; and
    outputting, via the processor, the particular location to a display.

2. The method of claim 1, wherein the particular mark comprises a unique three-dimensional pattern comprising one or more elements selected from the list consisting of: bumps, grooves and road textures.

3. The method of claim 1, wherein the particular mark comprises electromagnetic device and wherein the inertial sensor further comprises a magnetometer.

4. The method of claim 1, wherein the inertial sensor measures at least one of accelerations and angular velocities at x, y and z directions.

5. The method of claim 1, wherein the road comprises a plurality of lanes, wherein each of the lanes includes one of the plurality of predetermined unique marks, the method further comprising determining the lane in which the vehicle is located based on the detected signal signature.

6. The method of claim 1, wherein the road comprises at least one lane, wherein the particular mark is located on a lane border, the method further comprising determining that the vehicle has crossed the lane border based on the detected signal signature.

7. The method of claim 1, wherein the vehicle is a mobile robot.

8. The method of claim 1, wherein the vehicle is an unmanned ground vehicle.

9. The method of claim 1, wherein the pattern recognition algorithm comprises a machine learning (ML) classifier, and wherein determining in the at least one of the acceleration or the angular velocity a signal signature comprises:
    training the ML classifier using a training dataset, wherein the training dataset comprises labeled signals of the inertial sensor; and
    using the trained ML classifier to classify the readings of the inertial sensor.

10. The method of claim 1, further comprising:
    detecting in the readings of the inertial sensor signals associated with a second mark of the at least one mark; and
    determining a velocity of the vehicle by dividing a known distance between the second mark and the first mark by the time from the detection of the first mark to time of the detection of the second mark.

11. A system for estimating a location of a vehicle, the system comprising:
    a memory; and
    a processor configured to:
        measure, via only an inertial sensor attached to a vehicle, at least one of an acceleration or angular velocity of the vehicle;
        determine in the at least one of the acceleration or the angular velocity a signal signature based on a pattern recognition algorithm, wherein the signal signature is associated with a particular mark located at a particular location, wherein the particular mark comprises a unique three-dimensional pattern including one or more elements selected from the list consisting of: bumps, grooves and road textures, wherein the one or more elements affect an angular velocity on the x axis and an angular velocity on the y axis as the vehicle rolls while passing over the elements;

determine that the vehicle is located at the particular location based on a predetermined association between the particular mark and the particular location; and output the particular location to display.

12. The system of claim 11, wherein the particular mark comprises a unique three-dimensional pattern comprising one or more elements selected from the list consisting of: bumps, grooves and road textures.

13. The system of claim 11, wherein the particular mark comprises electromagnetic device and wherein the inertial sensor further comprises a magnetometer.

14. The system of claim 11, wherein the inertial sensor measures at least one of accelerations and angular velocities at x, y and z directions.

15. The system of claim 11, wherein the road comprises a plurality of lanes, wherein each of the lanes includes one of the plurality of predetermined unique marks, and wherein the processor is further configured to determine the lane in which the vehicle is located based on the detected signal signature.

16. The system of claim 11, wherein the road comprises at least one lane, wherein the particular mark is located on a lane border, and wherein the processor is further configured to determine that the vehicle has crossed the lane border based on the detected signal signature.

17. The system of claim 11, wherein the vehicle is a mobile robot.

18. The system of claim 11, wherein the vehicle is an unmanned ground vehicle.

19. The system of claim 11, wherein the pattern recognition algorithm comprises a machine learning (ML) classifier, and wherein the processor is configured to determine in the at least one of the acceleration or the angular velocity a signal signature by:

training the ML classifier using a training dataset, wherein the training dataset comprises labeled signals of the inertial sensor; and using the trained ML classifier to classify the readings of the inertial sensor.

20. The system of claim 11, wherein the processor is further configured to:

detect in the readings of the inertial sensor signals associated with a second mark of the at least one mark; and determine a velocity of the vehicle by dividing a known distance between the second mark and the first mark by the time from the detection of the first mark to time of the detection of the second mark.

\* \* \* \* \*